(12) United States Patent
Biederman et al.

(10) Patent No.: US 7,885,296 B2
(45) Date of Patent: Feb. 8, 2011

(54) MAINTAINING CONSISTENCY AMONG MULTIPLE TIMESTAMP COUNTERS DISTRIBUTED AMONG MULTIPLE DEVICES

(75) Inventors: Daniel Christian Biederman, San Jose, CA (US); Haichuan Tan, Santa Clara, CA (US); Senthil Arumugam, San Jose, CA (US); Howard Borchew, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 853 days.

(21) Appl. No.: 11/494,104

(22) Filed: Jul. 27, 2006

(65) Prior Publication Data

US 2008/0025344 A1 Jan. 31, 2008

(51) Int. Cl.
*H04J 3/06* (2006.01)
(52) U.S. Cl. .................................. 370/503; 370/350
(58) Field of Classification Search ............. 370/464, 370/498, 503, 347, 350, 349
See application file for complete search history.

(56) References Cited

U.S. PATENT DOCUMENTS

| | | | |
|---|---|---|---|
| 6,347,084 B1* | 2/2002 | Hulyalkar et al. | 370/347 |
| 6,492,944 B1* | 12/2002 | Stilp | 342/387 |
| 7,313,686 B2 | 12/2007 | Biederman et al. | |
| 7,327,693 B1 | 2/2008 | Rivers et al. | |
| 2004/0141526 A1 | 7/2004 | Balasubramanian et al. | |
| 2005/0058159 A1 | 3/2005 | Chapman | |
| 2005/0060619 A1* | 3/2005 | Liberty et al. | 714/55 |
| 2005/0071628 A1 | 3/2005 | Yang et al. | |

(Continued)

OTHER PUBLICATIONS

"IEEE Standard for a Precision Clock Synchronization Protocol for Networked Measurement and Control Systems," IEEE Std 1588-2002, IEEE Instrumentation and Measurement Society, New York, NY, USA, Nov. 8, 2002, 154 pages.

(Continued)

*Primary Examiner*—Huy D Vu
*Assistant Examiner*—Dady Chery
(74) *Attorney, Agent, or Firm*—The Law Office of Kirk D. Williams

(57) ABSTRACT

Disclosed are, inter alia, methods, apparatus, data structures, computer-readable media, mechanisms, and means for maintaining consistency among timestamp counters distributed among multiple devices. When timestamp counters are distributed among multiple physical devices, variances in their timestamp values can occur, such as, but not limited to those cause by variances among clocks in these different devices, different routing delays, different components, etc. These differences may be same, but still not allow high enough precision, especially as packet and processing rates continue to increase (which also causes clocking rates of devices to increase). One implementation distributes a time advance signal to each of these devices, which each device independently uses to determine when to advance its timestamp counter in response to its clock signal. These timestamps may be generated according to IEEE 1588 Standard for a Precision Clock Synchronization Protocol for Networked Measurement and Control Systems; and/or Physical Layer Transceivers (PHYs) may be disposed in each of the different physical devices.

31 Claims, 13 Drawing Sheets

U.S. PATENT DOCUMENTS

2005/0207387 A1     9/2005     Middleton et al.
2006/0245454 A1*   11/2006   Balasubramanian et al.   370/509
2007/0223477 A1*    9/2007     Eidson ....................... 370/392
2008/0080562 A1     4/2008     Burch et al.

OTHER PUBLICATIONS

John Eidson, "IEEE-1588 Standard for a Precision Clock Synchronization Protocol for Networked Measurement and Control Systems—A Tutorial," Agilent Technologies, Inc., Oct. 10, 2005, 106 pages.

Hans Weibel, "High Precision Clock Synchronization according to IEEE 1588 Implementation and Performance Issues," Proc. Embedded World 2005, Nurenberg, Germany, Feb. 2005, 9 pages.

John Guilford, "Design of an FPGA-Based Hardware IEEE-1588 Implementation," IEEE-1588 Conference, Oct. 2005, Agilent Technologies, 10 pages.

John Guilford, "Design of an FGPA-Based Hardware IEEE-1588 Implementation," IEEE-1588 Conference and Plug-Fest, Winterthur, Switzerland, Agilent Technologies, Oct. 10-12, 2005, 24 pages.

Holler et al., "Chip-Design Building Blocks for Precision Clock Synchronization in Ethernet Networks," Institute of Computer Technology, Oregano Systems, 23 pages.

"ERTEC 200 Enhanced Real-Time Ethernet Controller with 32-bit RISC CPU Core," Preliminary Data Sheet, NEC Electronics Corporation, May 2006, 45 pages.

"ERTEC 400 Enhanced Real-Time Ethernet Controller with 32-bit RISC CPU Core," Preliminary Data Sheet, NEC Electronics Corporation, Dec. 2005, 41 pages.

U.S. Appl. No. 11/493,981, filed Jul. 27, 2006, Biederman et al.

* cited by examiner

MAINTAINING CONSISTENCY AMONG MULTIPLE TIMESTAMP COUNTERS DISTRIBUTED AMONG MULTIPLE DEVICES

TECHNICAL FIELD

One embodiment of the invention relates to communications and computer systems, especially routers, packet switching systems, and other devices; and more particularly, one embodiment relates to maintaining consistency among multiple timestamp counters distributed among multiple devices, with such timestamps corresponding to, but not limited to, timestamps generated according to IEEE 1588 Standard for a Precision Clock Synchronization Protocol for Networked Measurement and Control Systems such as in, but not limited to being in, Physical Layer Transceivers (PHYs) disposed in different physical devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP). Note, nothing described or referenced in this document is admitted as prior art to this application unless explicitly so stated.

Measurement and control systems are widely used in traditional test and measurement, industrial automation, communication systems, electrical power systems and many other areas of modern technology. The timing requirements placed on these measurement and control systems are becoming increasingly stringent. Traditionally these measurement and control systems have been implemented in a centralized architecture in which the timing constraints are met by careful attention to programming combined with communication technologies with deterministic latency. In recent years an increasing number of such systems utilize a more distributed architecture and increasingly networking technologies having less stringent timing specifications than the older more specialized technologies. In particular, Ethernet communications are becoming more common in measurement and control applications. This has led to alternate means for enforcing the timing requirements in such systems. One such technique is the use of system components that contain real-time clocks, all of which are synchronized to each other within the system. This is very common in the general computing industry. For example, essentially all general purpose computers contain a clock. These clocks are used to manage distributed file systems, backup and recovery systems and many other similar activities. These computers typically interact via LANs and the Internet. In this environment the most widely used technique for synchronizing the clocks is the Network Time Protocol, NTP, or the related SNTP.

It is not uncommon for the timing accuracies to be required to be in the sub-microsecond range, with the requirement that this synchronization must be available on a range of networking technologies including Ethernet as well as other technologies found in industrial automation and similar industries. IEEE 1588 addresses the clock synchronization requirements of measurement and control systems. However, especially when used in conjunction with Ethernet and other local area network technologies, there can be jitter in the synchronization, which leads to a larger inaccuracies among clocks.

FIG. 1 illustrates a prior art configuration for associating timestamps with frames. Shown is a hardware-assist circuit which monitors the 125 MHZ GMII transmit and receive signals between the MAC and PHY. Two independent PTP message detection logic blocks facilitate time stamping of transmit and receive paths. The hardware assist uses a frequency compensated clock to keep system time. In this circuit a 32-bit accumulator adds the contents of addend register to itself at the frequency of 100 MHz. The 64-bit system clock counter is incremented whenever the accumulator overflows. This provides a high precision frequency compensated clock that can be tuned to one part per billion compensation accuracy.

SUMMARY

Disclosed are, inter alia, methods, apparatus, data structures, computer-readable media, mechanisms, and means for maintaining consistency among timestamp counters distributed among multiple devices. When timestamp counters are distributed among multiple physical devices, variances in their timestamp values can occur, such as, but not limited to those cause by variances among clocks in these different devices, different routing delays, different components, etc. These differences may be same, but still not allow high enough precision, especially as packet and processing rates continue to increase (which also causes clocking rates of devices to increase). One embodiment distributes a time advance signal to each of these devices, which each device independently uses to determine when to advance its timestamp counter in response to its clock signal.

One embodiment includes multiple timestamp counters and a time advance generator. Each timestamp counter is disposed in a physically different device and configured to maintain a current timestamp value of a global time. Each of these timestamp counters also receives a clock signal generated from a same or different clock. Each particular timestamp counter includes a time advance input. Each particular timestamp counter is configured to be responsive to a clock advance signal communicated to its time advance input in order to determine whether or not to advance its current timestamp value in response to its received clock signal. The time advance generator is configured to periodically generate the clock advance signal.

In one embodiment, the time advance generator is located in one the physical devices with one of the timestamp counters. In one embodiment, each of the physical devices comprise different Physical Layer Transceivers (PHYs), and the timestamp counters are located in these PHYs. One embodiment includes a processor communicatively coupled to each of the timestamp counters; wherein the processor is configured to set the current timestamp value of each of the plurality of timestamp counters. In one embodiment, each of these PHYs are configured to store a timestamp acquired from its respective timestamp counter corresponding to a received packet. In one embodiment, the timestamps are generated by the plurality of timestamp counters according to IEEE 1588 Standard for a Precision Clock Synchronization Protocol for Networked Measurement and Control Systems. In one embodiment, the processor is configured to collect the stored timestamps from the PHYs. One embodiment includes a processor communicatively coupled to each of the timestamp counters; and the processor is configured to perform the sequence of: (a) disabling the time advance generator, (b) setting the current timestamp value of each of the plurality of timestamp counters to a same nonzero value; and then (c) enabling the time advance generator. In one embodiment, the time advance generator is located in one of the PHYs.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1:
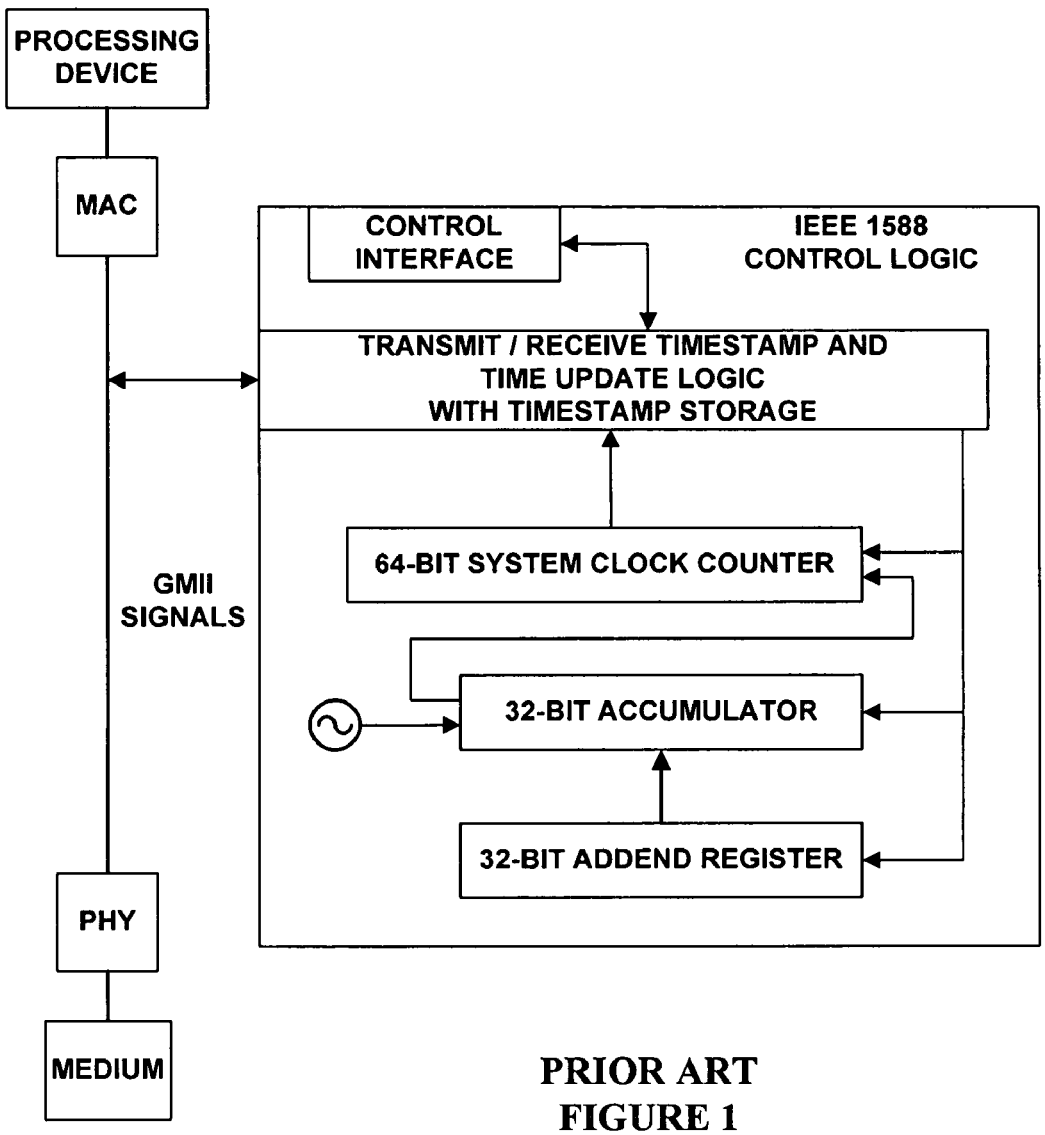
FIG. 1 illustrates a prior art configuration for associating timestamps with frames.

Disclosed are, inter alia, methods, apparatus, data structures, computer-readable media, mechanisms, and means for maintaining consistency among timestamp counters distributed among multiple devices. This synchronization of timestamps includes all forms of synchronization/manipulation, such as, but not limited to, time (e.g., time of day), phase synchronization, and frequency synchronization.

Note, embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

As used herein, the term "packet" refers to packets of all types or any other units of information or data, including, but not limited to, fixed length cells and variable length packets, each of which may or may not be divisible into smaller packets or cells. The term "frame" is used herein interchangeably with the term "packet." The term "packet" as used herein also refers to both the packet itself or a packet indication, such as, but not limited to all or part of a packet or packet header, a data structure value, pointer or index, or any other part or direct or indirect identification of a packet or information associated therewith. For example, often times a router operates on one or more fields or data of a packet, especially the header, so the body of the packet is often stored in a separate memory while the packet header is manipulated, and based on the results of the processing of the packet (i.e., the packet header in this example), the entire packet is forwarded or dropped, etc. Additionally, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data. The term or reference to "dropping" a packet or a variant thereof (e.g., drop the packet, the packet is dropped, etc.) is used herein to identify the physical dropping of the packet, causing the packet to be dropped, and/or marking or distinguishing the packet for subsequent dropping or potentially different processing (e.g., a higher probability of being dropped by subsequent processing, Early Congestion Notification marking, etc.) than that of an "admitted" packet. The term "interface" of a networked device refers to a physical interface, a logical interface (e.g., a portion of a physical interface or sometimes referred to in industry as a sub-interface—for example, such as, but not limited to a particular VLAN associated with a network interface), and/or a virtual interface (e.g., traffic grouped together based on some characteristic—for example, such as, but not limited to, a tunnel interface).

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process the value—the value must be obtained prior to processing it, although some of the associated processing may be performed prior to, concurrently with, and/or after the read operation). Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications media or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, and/or other storage mechanism tangibly embodying instructions and/or data. The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, data structures, computer-readable media, mechanisms, and means for maintaining consistency among timestamp counters distributed among multiple devices. When timestamp counters are distributed among multiple physical devices, variances in their timestamp values can occur, such as, but not limited to those cause by variances among clocks in these different devices, different routing delays, different components, etc. These differences may be same, but still not allow high enough precision, especially as packet and processing rates continue to increase (which also causes clocking rates of devices to increase). One embodiment distributes a time advance signal to each of these devices, which each device independently uses to determine when to advance its timestamp counter in response to its clock signal.

One embodiment includes multiple timestamp counters and a time advance generator. Each timestamp counter is disposed in a physically different device and configured to maintain a current timestamp value of a global time. Each of these timestamp counters also receives a clock signal generated from a same or different clock. Each particular timestamp counter includes a time advance input. Each particular timestamp counter is configured to be responsive to a clock advance signal communicated to its time advance input in order to determine whether or not to advance its current timestamp value in response to its received clock signal. The time advance generator is configured to periodically generate the clock advance signal.

In one embodiment, the time advance generator is located in one the physical devices with one of the timestamp counters. In one embodiment, each of the physical devices comprise different Physical Layer Transceivers (PHYs), and the timestamp counters are located in these PHYs. One embodiment includes a processor communicatively coupled to each of the timestamp counters; wherein the processor is configured to set the current timestamp value of each of the plurality of timestamp counters. In one embodiment, each of these PHYs are configured to store a timestamp acquired from its respective timestamp counter corresponding to a received packet. In one embodiment, the timestamps are generated by the plurality of timestamp counters according to IEEE 1588 Standard for a Precision Clock Synchronization Protocol for Networked Measurement and Control Systems. In one embodiment, the processor is configured to collect the stored timestamps from the PHYs. One embodiment includes a processor communicatively coupled to each of the timestamp counters; and the processor is configured to perform the sequence of: (a) disabling the time advance generator, (b) setting the current timestamp value of each of the plurality of timestamp counters to a same nonzero value; and then (c) enabling the time advance generator. In one embodiment, the time advance generator is located in one of the PHYs.

One embodiment is configured to maintain consistency among timestamp counters distributed among Physical Layer Transceivers (PHYs). One embodiment includes multiple physically different PHY devices, with each of these PHY devices including one or more PHY interfaces configured to interface between a medium and a Media Access Controller (MAC) and configured to record current timestamp values associated with certain interfaced packets. Each of these PHY devices includes a timestamp counter configured to maintain its current timestamp value of a global time in response to a clock signal and a clock advance signal, wherein the clock advance signal identifies whether or not to advance its current timestamp value in response to its clock signal. One of these PHY devices includes a time advance generator configured to periodically generate the clock advance signal, wherein the clock advance signal is communicatively coupled to the timestamp counter in each of the PHY devices.

In one embodiment, each of these PHY devices includes a clock configured to generate its the clock signal. One embodiment includes a processing device, communicatively coupled to each of the PHY devices, configured to control the starting and stopping of the time advance generator. In one embodiment, the processing device is configured to set each of the timestamp counters in the PHY devices to a nonzero value. In one embodiment, the processing device is configured to receive the recorded current timestamp values. In one embodiment, the current timestamp values are generated by the plurality of timestamp counters according to IEEE 1588 Standard for a Precision Clock Synchronization Protocol for Networked Measurement and Control Systems. One embodiment includes a processor communicatively coupled to each of the timestamp counters; wherein the processor is configured to perform the sequence of: (a) disabling the time advance generator, (b) setting the current timestamp value of each of the plurality of timestamp counters to a same nonzero value; and then (c) enabling the time advance generator.

One embodiment performs operations for maintaining consistency among timestamp counters for timestamping packets in an apparatus. These operations include: setting a timestamp counter of a plurality of different timestamp counters to current time of day, with each of the plurality of different timestamp counters being disposed in physically different devices; periodically generating a time advance signal in one of the plurality of different devices and providing the time advance signal to each of the timestamp counters, and advancing the current timestamp value of each particular timestamp counter of the timestamp counters in response to the time advance signal and an additional respective clock signal corresponding to the different device in which the particular timestamp counter is disposed; and recording timestamps corresponding to packets by each of the plurality of different devices and providing the recorded timestamps to one or more external devices.

In one embodiment, setting set timestamp counters to the current time of day includes: sending and receiving of IEEE 1588 Standard for a Precision Clock Synchronization Protocol for Networked Measurement and Control Systems (IEEE 1588) time synchronization messages with an external clocking device to establish the current time of day according to IEEE 1588. In one embodiment, these operations include stopping the period generation of the time advance signal, which causes the timestamp counters to stop the advancing their current timestamp values.

One embodiment, configured to maintain consistency among timestamp counters used for timestamping packets, includes: means for setting a timestamp counter of a plurality of different timestamp counters to current time of day, with each of the plurality of different timestamp counters being disposed in physically different devices; means for periodically generating a time advance signal in one of the plurality of different devices and providing the time advance signal to each of the timestamp counters; a plurality of means for advancing the current timestamp value of each particular timestamp counter of the timestamp counters in response to the time advance signal and an additional respective clock signal corresponding to the different device in which the particular timestamp counter is disposed, each of said means for advancing the current timestamp value of each particular timestamp counter of the timestamp counters being communicatively coupled to said means for periodically generating the time advance signal; and means for recording timestamps corresponding to packets by each of the plurality of different devices and providing the recorded timestamps to one or more external devices.

In one embodiment, said means for setting set timestamp counters to the current time of day includes: means for sending and receiving of IEEE 1588 Standard for a Precision Clock Synchronization Protocol for Networked Measurement and Control Systems (IEEE 1588) time synchronization messages with an external clocking device to establish the current time of day according to IEEE 1588.

Also disclosed, inter alia, is a Physical Layer Transceiver (PHY) with integrated time synchronization, such as, but not limited to, IEEE 1588 Standard for a Precision Clock Synchronization Protocol for Networked Measurement and Control Systems. This synchronization includes all forms of synchronization/manipulation, such as, but not limited to, time (e.g., time of day), phase synchronization, and frequency synchronization. The PHY includes circuitry to maintain a current time, and to trigger the storage of timestamps corresponding to received frames. Typically, in response to a request from an external device, the timestamps are retrieved from storage and are communicated to the external device. By moving the triggering of the storage of the timestamps by the PHY itself, rather than by a monitoring of the traffic between the PHY and the Media Access Controller (MAC), higher accuracy can typically be achieved.

One embodiment includes an apparatus configured to maintain consistency among timestamp counters distributed among multiple devices, the apparatus comprising: a plurality of timestamp counters with each of the plurality of timestamp counters configured to maintain a current timestamp value of a global time, with each of the plurality of timestamp counters disposed in a physical device different from the physical device in which another of said timestamp counters are disposed; wherein each of said timestamp counters receives a clock signal generated from a same or different clock of one or more clocks; wherein each particular timestamp counter of the plurality of timestamp counters includes a time advance input, with each said particular timestamp counter being configured to be responsive to a clock advance signal communicated to its said time advance input in order to determine whether or not to advance its current timestamp value in response to its said received clock signal; and a time advance generator configured to periodically generate the clock advance signal, wherein the time advance generator is communicatively coupled to said time advance input of each of the plurality of timestamp counters.

In one embodiment, each of said physical devices comprise different Physical Layer Transceivers (PHYs), and the timestamp counters are located in said PHYs. In one embodiment, the apparatus further comprises a processor communicatively coupled to each of the timestamp counters; wherein the processor is configured to set said current timestamp value of each of the plurality of timestamp counters. In one embodiment, wherein each of said PHYs are configured to store a timestamp acquired from its respective said timestamp counter corresponding to a received packet. In one embodiment, said timestamps are generated by the plurality of timestamp counters according to IEEE 1588 Standard for a Precision Clock Synchronization Protocol for Networked Measurement and Control Systems. In one embodiment, the processor is configured to collect said stored timestamps from said PHYs. In one embodiment, the apparatus further comprises a processor communicatively coupled to each of the timestamp counters; wherein the processor is configured to perform the sequence of: (a) disabling the time advance generator, (b) setting said current timestamp value of each of the plurality of timestamp counters to a same nonzero value; and then (c) enabling the time advance generator. In one embodiment, said timestamps are generated by the plurality of timestamp counters according to IEEE 1588 Standard for a Precision Clock Synchronization Protocol for Networked Measurement and Control Systems. In one embodiment, the time advance generator is located in one of said PHYs. In one embodiment, the time advance generator is located in one of said physical devices with one of said timestamp counters. In one embodiment, the apparatus further comprises a processor communicatively coupled to each of the timestamp counters and the time advance generator; wherein the processor is configured to perform the sequence of: (a) disabling the time advance generator, (b) setting said current timestamp value of each of the plurality of timestamp counters; and then (c) enabling the time advance generator.

One embodiment includes an apparatus configured to maintain consistency among timestamp counters distributed among Physical Layer Transceivers (PHYs), the apparatus comprising: a plurality of physically different PHY devices, with each of said PHY devices including one or more PHY interfaces configured to interface between a medium and a Media Access Controller (MAC) and configured to record current timestamp values associated with certain interfaced packets, said PHY physical devices including a first PHY device and one or more second PHY devices; wherein each of said PHY devices includes a timestamp counter configured to maintain its said current timestamp value of a global time in response to a clock signal and a clock advance signal, wherein the clock advance signal identifies whether or not to advance its said current timestamp value in response to its said clock signal; and wherein the first PHY device includes a time advance generator configured to periodically generate the clock advance signal, wherein the clock advance signal is communicatively coupled to said timestamp counter in each of said PHY devices.

In one embodiment, each of said PHY devices includes a clock configured to generate its said clock signal. In one embodiment, the apparatus includes a processing device, communicatively coupled to each of said PHY devices, configured to control the starting and stopping of the time advance generator. In one embodiment, the processing device is configured to set each of said timestamp counters in said PHY devices to a nonzero value. In one embodiment, the processing device is configured to receive said recorded current timestamp values. In one embodiment, said current timestamp values are generated by the plurality of timestamp counters according to IEEE 1588 Standard for a Precision Clock Synchronization Protocol for Networked Measurement and Control Systems. In one embodiment, the apparatus further comprises a processor communicatively coupled to each of the timestamp counters; wherein the processor is configured to perform the sequence of: (a) disabling the time advance generator, (b) setting said current timestamp value of each of the plurality of timestamp counters to a same nonzero value; and then (c) enabling the time advance generator.

One embodiment includes a method performed in an apparatus for maintaining consistency among timestamp counters for timestamping packets, the method comprising: setting a timestamp counter of a plurality of different timestamp counters to current time of day, with each of the plurality of different timestamp counters being disposed in physically different devices; periodically generating a time advance signal in one of said plurality of different devices and providing the time advance signal to each of said timestamp counters, and advancing said current timestamp value of each particular timestamp counter of said timestamp counters in response to the time advance signal and an additional respective clock signal corresponding to said different device in which said particular timestamp counter is disposed; and recording timestamps corresponding to packets by each of the plurality of different devices and providing said recorded timestamps to one or more external devices.

In one embodiment, said setting set timestamp counters to said current time of day includes: sending and receiving of IEEE 1588 Standard for a Precision Clock Synchronization Protocol for Networked Measurement and Control Systems (IEEE 1588) time synchronization messages with an external clocking device to establish said current time of day according to IEEE 1588. In one embodiment, the method further comprises stopping said period generation of the time advance signal, which causes said timestamp counters to stop said advancing their current timestamp values.

One embodiment includes an apparatus configured to maintain consistency among timestamp counters used for timestamping packets, the apparatus comprising: means for setting a timestamp counter of a plurality of different timestamp counters to current time of day, with each of the plurality of different timestamp counters being disposed in physically different devices; means for periodically generating a time advance signal in one of said plurality of different devices and providing the time advance signal to each of said timestamp counters; a plurality of means for advancing said current timestamp value of each particular timestamp counter of said timestamp counters in response to the time advance signal and an additional respective clock signal corresponding to said different device in which said particular timestamp counter is disposed, each of said means for advancing said current timestamp value of each particular timestamp counter of said timestamp counters being communicatively coupled to said means for periodically generating the time advance signal; and means for recording timestamps corresponding to packets by each of the plurality of different devices and providing said recorded timestamps to one or more external devices.

In one embodiment, said means for setting set timestamp counters to said current time of day includes: means for sending and receiving of IEEE 1588 Standard for a Precision Clock Synchronization Protocol for Networked Measurement and Control Systems (IEEE 1588) time synchronization messages with an external clocking device to establish said current time of day according to IEEE 1588.

Figure 2:
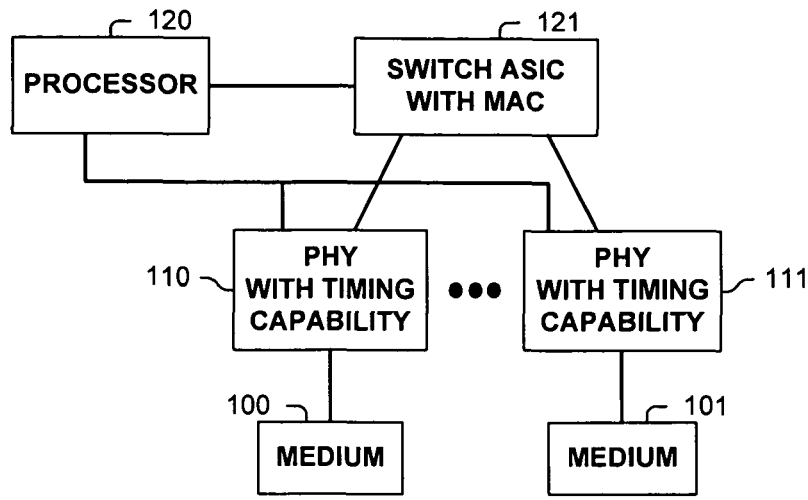
FIG. 2 is a block diagram illustrating a configuration of one embodiment including PHY devices with internal timing capability.

Turning to the figures, FIG. 2 illustrates a configuration of one embodiment including PHY devices with internal timing capability. Illustrated are two PHY devices (110, 111) with timing capability, such as, but not limited to, those disclosed herein (e.g., IEEE 1588 Standard for a Precision Clock Synchronization Protocol for Networked Measurement and Control Systems). PHY devices 110-111 receive and transmit frames between media 100 and 101 to the MAC in Switch ASIC 121. PHY devices (110, 111) maintain the current time, and associate timestamps with the arrival and/or transmission of frames. Typically, only a selected portion of the frames have timestamps associated with them. Therefore PHY devices 110, 111 may perform some parsing of the frames to identify whether or not to associate a timestamp with a particular frame, or possibly, to identify whether or not to drop a generated timestamp corresponding to the start of the frame.

Processor 120 communicates with PHY devices 110 and 111 typically to set and adjust the current time, as well as to retrieve timestamps of frames of interest. For example, processor 120 will send a request to the appropriate PHY device (110, 111), which will retrieve the corresponding timestamp(s) (e.g., identified by a specified signature (e.g., hash value or value of a field from a frame, etc.) of a frame with an associated timestamp being stored in memory in PHY device 110, 111), and communicate the corresponding timestamp back to processor 120. In one embodiment, processor 120 controls one or more of PHYs 110-111. In one embodiment, processor 120 controls the time synchronization functionality of PHYs 110-111, including, but not limited to, turning on and off the functionality.

Figure 3A:
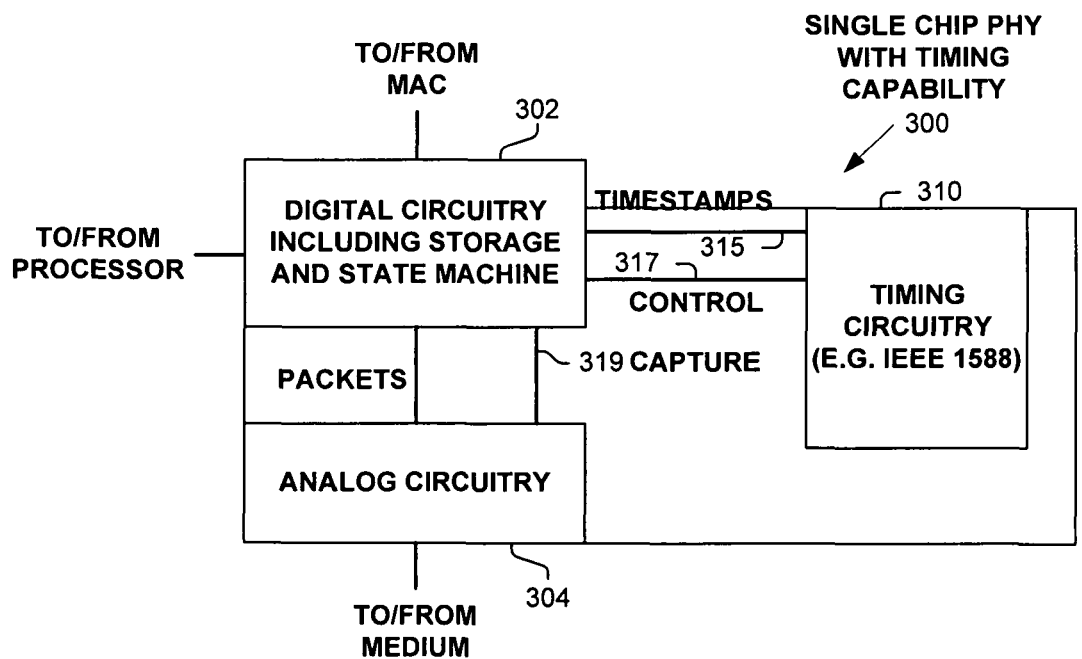
FIG. 3A is a block diagram illustrating a configuration of one embodiment of a PHY device with internal timing capability.

FIG. 3A is a block diagram illustrating a configuration of one embodiment of a PHY device 300 with internal timing capability. As shown, PHY 300 includes timing circuitry 310 to maintain a current time (e.g., a global system-wide time, such as according to IEEE 1588 Standard for a Precision Clock Synchronization Protocol for Networked Measurement and Control Systems), and to provide timestamps (315) to digital circuitry 302 for associating with received frames.

In one embodiment, digital circuitry 302 includes storage for storing timestamps (315) associated with frames, as well as one or more state machines for processing, receiving and forwarding frames. In one embodiment, one of these state machines adds to the standard processing, receiving and forwarding of frames the functionality of identifying when to timestamp a frame.

Analog circuitry 304 performs the standard functionality of transmitting and receiving frames to/from a medium. In one embodiment, analog circuitry 304 provides a capture signal 319 to digital circuitry to capture and store a timestamp for a frame that is being received or transmitted.

Additionally, in one embodiment, digital circuitry 302 provides an interface to a processor for communicating timing setup information, if required, and for communicating stored timestamps, either via a push (e.g., automatically forward the timestamps to another device) or pull (e.g., forward the timestamps in response to a request for the timestamps) communication process.

Figure 3B:
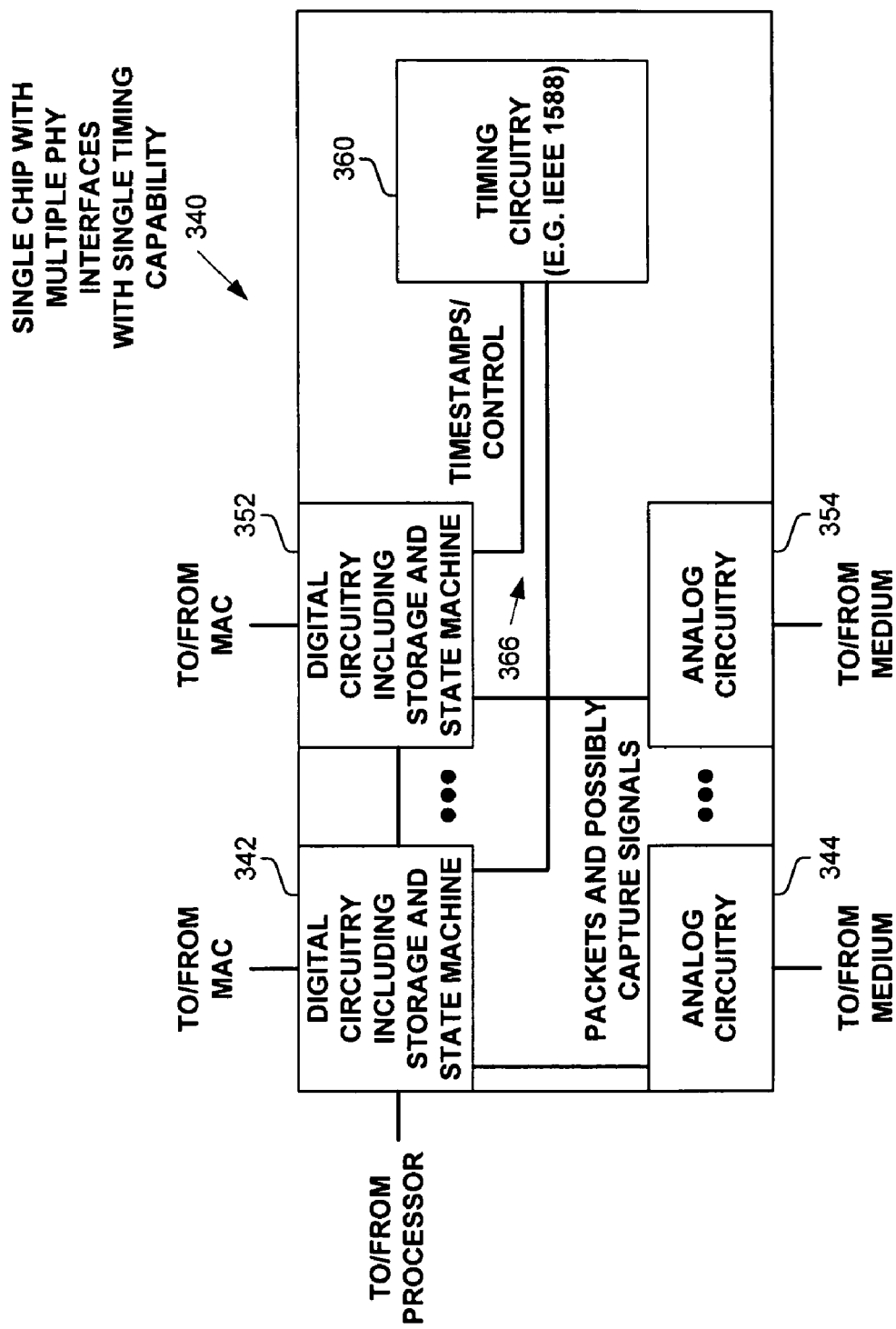
FIG. 3B is a block diagram illustrating a configuration of one embodiment of a multiple PHY device sharing an internal timing capability.

FIG. 3B is a block diagram illustrating a configuration of one embodiment of a multiple PHY device 340 sharing an internal timing capability 360. Digital circuitry 342, 352 operates in the same manner as described in relation to digital circuitry 302 of FIG. 3A, and analog circuitry 344, 354 operates in the same manner as described in relation to analog circuitry 304 of FIG. 3A.

Figure 4:
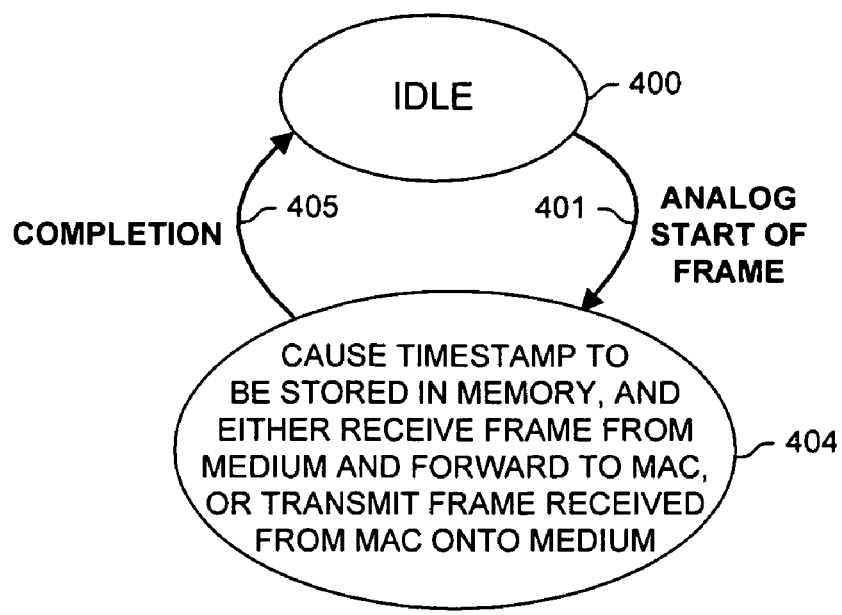
FIG. 4 is a block diagram illustrating a state diagram of a subset of operations performed in one embodiment.

FIG. 4 is a block diagram illustrating a state diagram of a subset of operations performed in one embodiment. Illustrated is idle state 400. In response to the detection or start of action by analog circuitry of receiving from or transmitting a frame on the medium, the current state transitions to state 404, wherein a timestamp is caused to be stored in memory, and the standard formulation of a frame being received and forwarded to the MAC or being transmitted onto the medium is performed. Upon completion (405) the state returns to idle state 400.

Figure 5A:
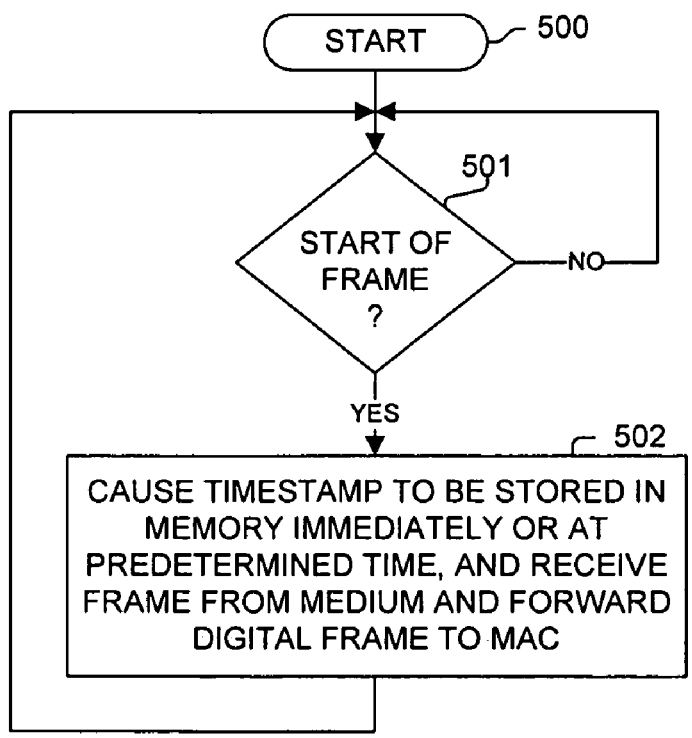
FIGS. 5A-B and 6 are flow diagrams illustrating processes performed in one embodiment.
Figure 5B:
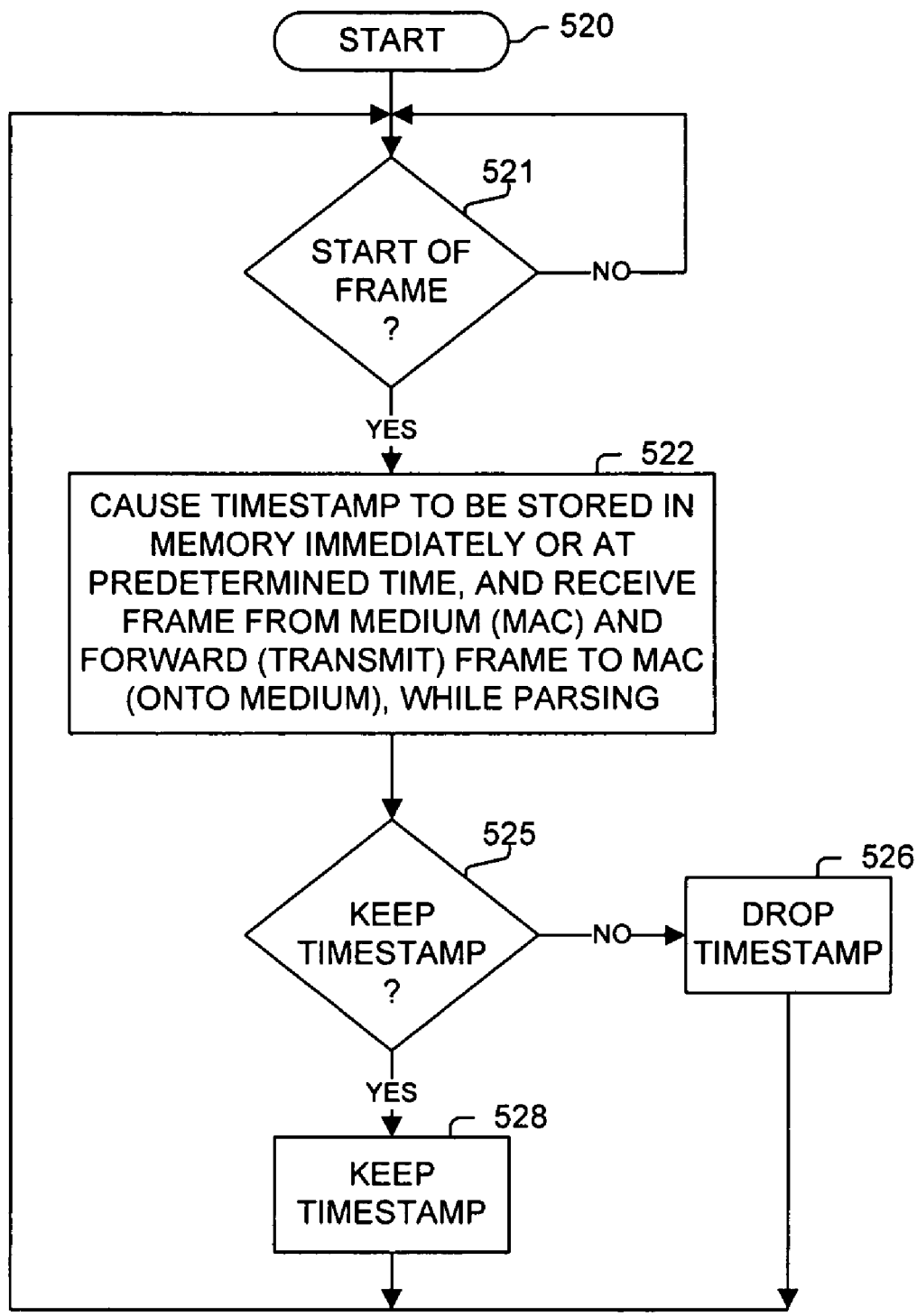
Figure 6:
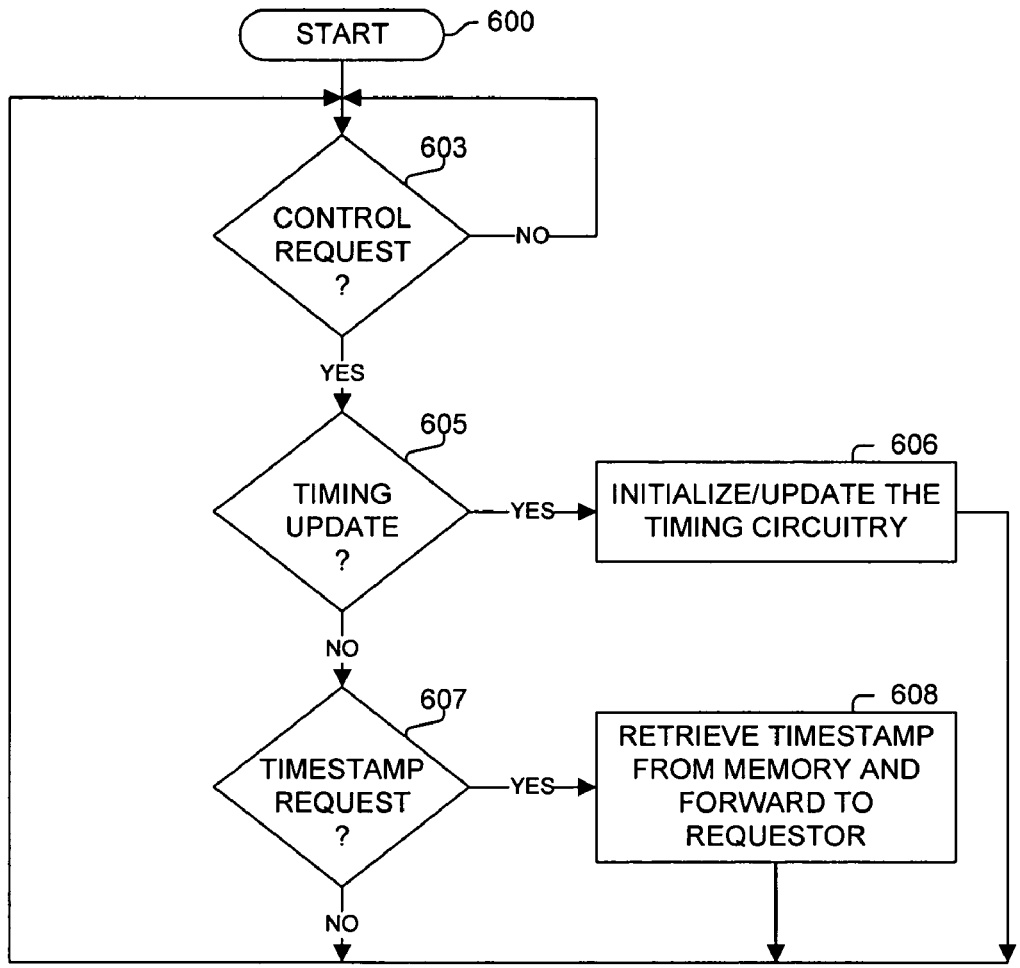

FIGS. 5A-B and 6 are flow diagrams illustrating processes performed in one embodiment.

FIG. 5A is used to illustrate a basic process used in one embodiment for associating timestamps with frames. Processing of FIG. 5A begins with process block 500. As determined in process block 501, upon start of a frame, processing proceeds to process block 502, wherein a timestamp (current or adjusted current value such as to accommodate a processing delay) is caused to be stored in the memory (or other storage) either immediately or at a predetermined time (e.g., after a delay to a particular byte of a frame), and the frame is received from the medium and a digital frame is forwarded to the MAC. Processing returns to process block 501.

FIG. 5B is used to illustrate a process used in one embodiment for associating timestamps with frames and then determining whether to keep the timestamp based on a parsing of the frame. Processing of the flow diagram of FIG. 5B begins with process block 520. As determined in process block 521, upon start of a frame, processing proceeds to process block 522, wherein a timestamp (current or adjusted current value such as to accommodate a processing delay) is caused to be stored in the memory (or other storage) either immediately or at a predetermined time (e.g., after a delay to a particular byte of a frame), and the frame is received from the medium (or MAC) and a frame is forwarded to the MAC (or transmitted onto the medium). Also, the frame is processed to identify whether or not to keep the timestamp. Thus, a timestamp as close as possible to the actual start of frame is available, if desired as determined by the parsing of the frame. As determined in process block 525, if the timestamp is to be kept, then it is kept (e.g., not dropped and possibly moved to another storage location); else, it is dropped in process block 526. Processing returns to process block 521.

FIG. 6 is used to illustrate a basic control process used in one embodiment for setting and/or adjusting the time, as well as communicating timestamps retrieved from storage to a remote device. Processing of FIG. 6 begins with process block 600. When a control request is received as determined in process block 603, then if it corresponds to a timing update, then in process block 606, the timing circuitry is initialized/updated. Otherwise, if the control request corresponds to a timestamp request as determined in process block 607, then in process block 608, the corresponding timestamp is retrieved from memory (or other storage) and communicated to the requester. In one embodiment, a control request for a timestamp will contain some signature (e.g., hash value or value of a field from a frame, etc.) of the frame so that its associated timestamp can be readily identified. Processing returns to process block 603.

Figure 7A:
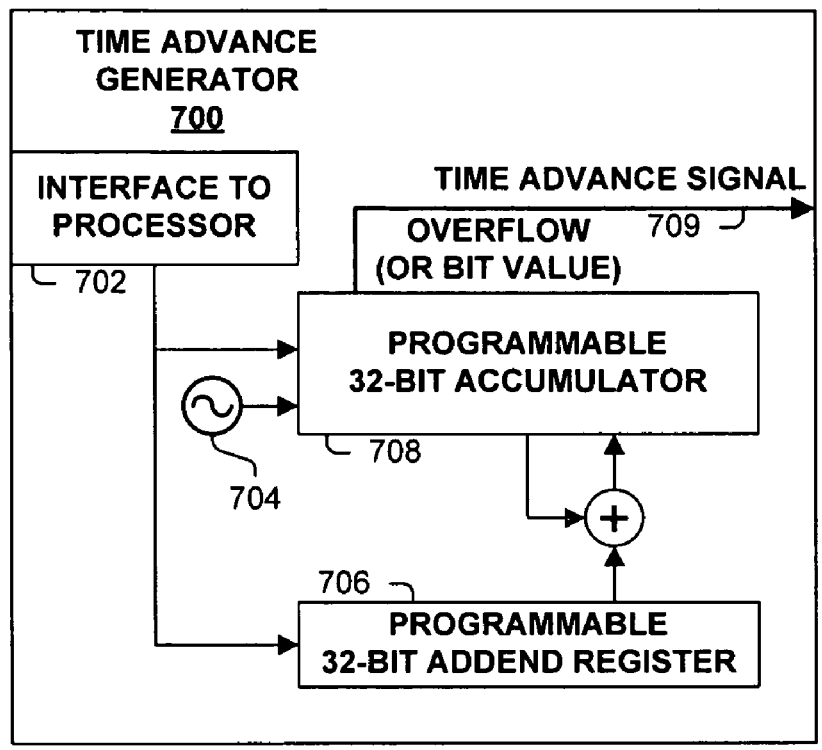
FIGS. 7A-C are block diagrams illustrating a few of an unlimited number of different circuits used that can be used in an embodiment for maintaining consistency among timestamp counters distributed among multiple devices.
Figure 7B:
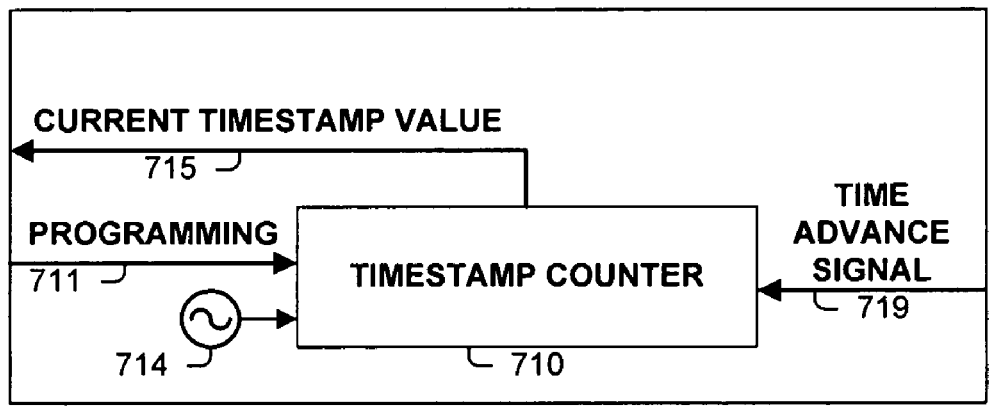
Figure 7C:
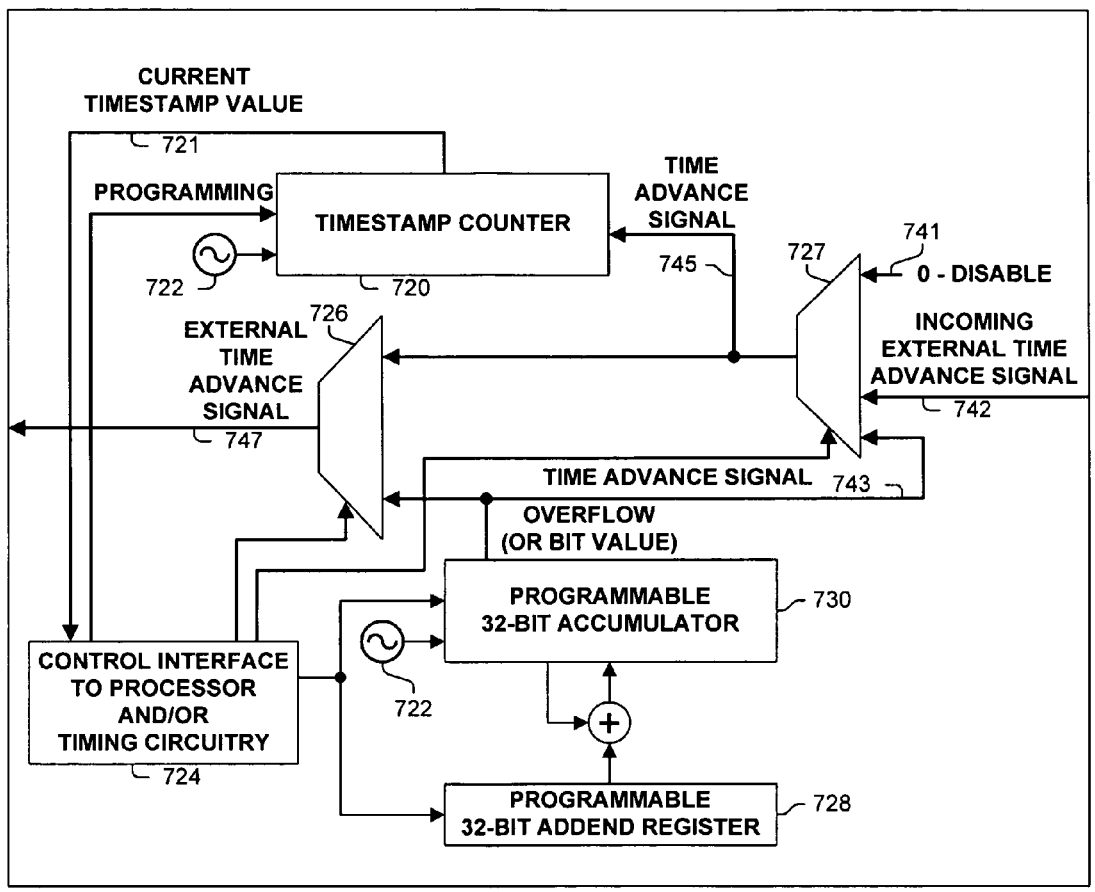

FIGS. 7A-C are block diagrams illustrating a few of an unlimited number of different circuits used that can be used in one embodiment for maintaining consistency among timestamp counters distributed among multiple devices.

FIG. 7A illustrates a time advance generator 700, which includes an interface 700 for communicating with one or more processors, and a frequency compensated clock to maintain the current timestamp value. As shown, accumulator 708 is increased by the contents of addend register 706 at the frequency of defined by clock signal 704. Time advance signal 709 is generated based on the value of the overflow signal or the high-order bit. Interface 702 is used to initialize the value of accumulator 708, set the value of addend register 706, and to enable/disable the generation of time advance signal 709.

FIG. 7B illustrates a timestamp counter 710, which can be initialized and updated via programming signals 711, and is responsive for advancing its current timestamp value 715 (some or all of its bits, which are made available to external devices) based on the time advance signal 719 and clock signal 714.

FIG. 7C illustrates a circuit used in one embodiment for maintaining consistency among timestamp counters distributed among multiple devices. As shown, this circuit includes a control/interface 724 for controlling the operation of this circuitry as well as communicating with an external one or more processors/devices. This circuitry can generate its own time advance signal 743 using its frequency compensated clock (elements 728 and 730 based on clock signal 722), be disabled (constantly low disable signal 741), or receive an externally generated time advance signal 742, with this selection be made by control 724 controlling the multiplexers 726 and 727. The selected time advance signal 745 or internally generated time advance signal 743 is made available to a possible next device/circuitry as external time advance signal 747. Timestamp counter 720 can be initialized by control 724, and advances based on clock signal 722 (typically the same clock signal used by its as used by its frequency compensated clock) and when enabled by time advance signal 745 (e.g., increment by one each time the overflow bit 743 is set). Current timestamp value 721 is made available to control interface 724 and/or timing circuitry 724 (e.g., for selectively recording the timestamps associated with packets and/or other events).

Figure 8A:
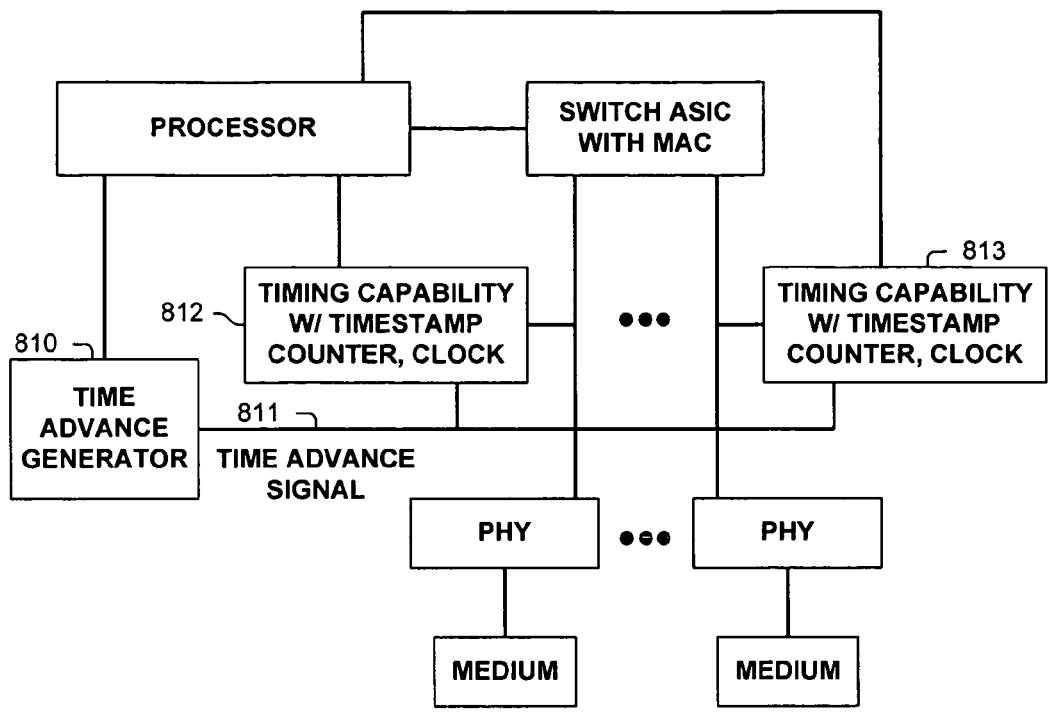
FIGS. 8A-D are block diagrams illustrating several of an unlimited number of different configurations that can used an embodiment.
Figure 8B:
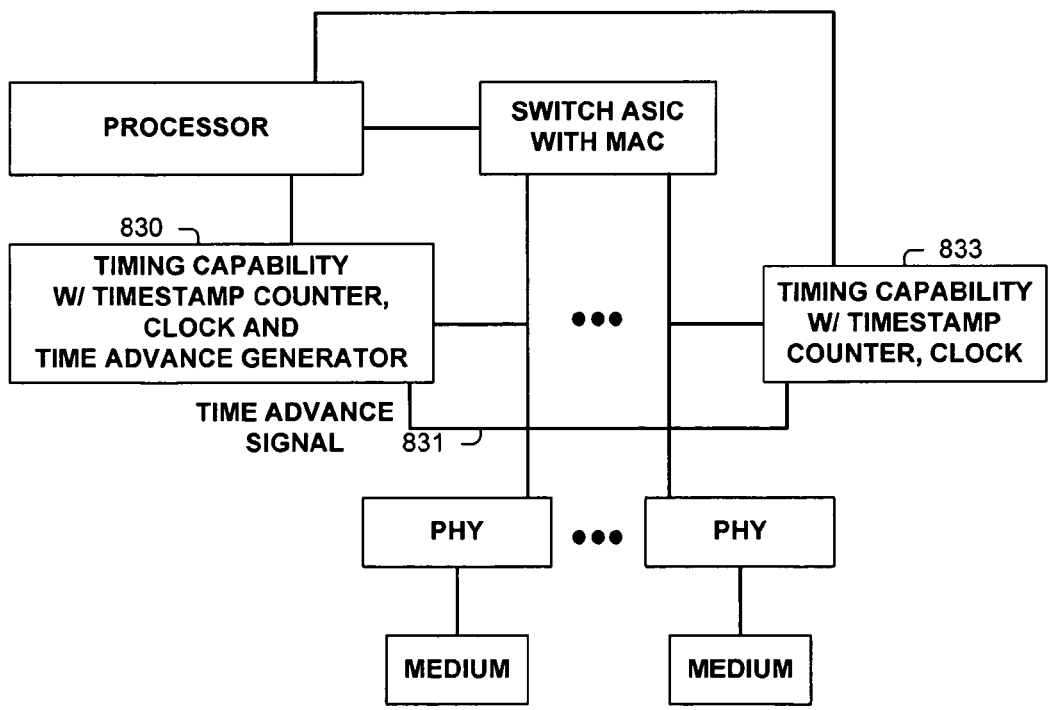
Figure 8C:
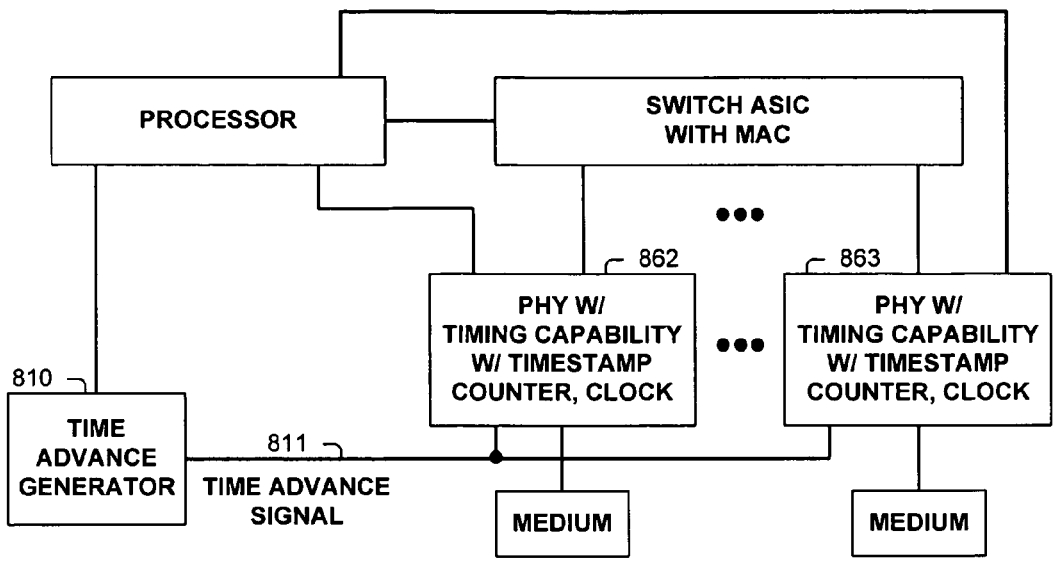
Figure 8D:
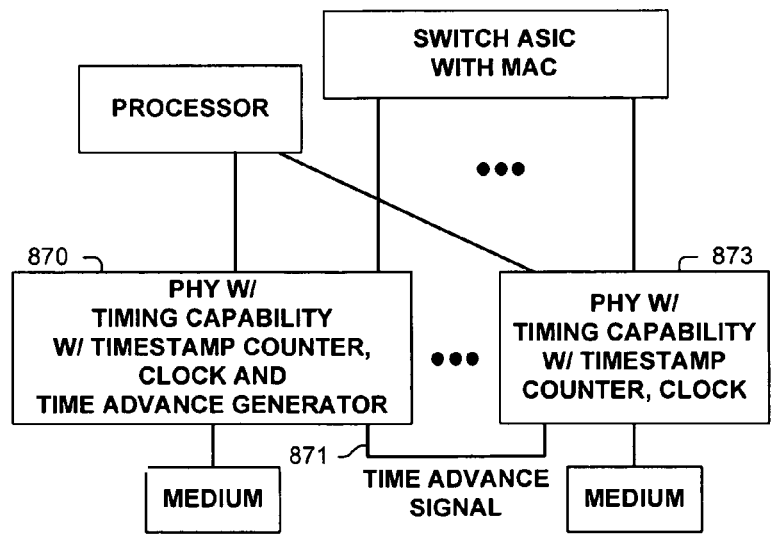

FIGS. 8A-D are block diagrams illustrating several of an unlimited number of different configurations that can used an embodiment. First, shown in FIG. 8A is a configuration with a time advance generator 810 which provides time advance signal 811 to two or more physically different devices 812-813, each of which include a timing capability, timestamp counter and clock. Next, FIG. 8B illustrates a device 830 including a timing capability, with a timestamp counter, clock, and time advance generator configured to generate time advance signal 831, which is provided to one or more other devices 833 with timing capability with a timestamp counter and clock. FIG. 8C illustrates a configuration with a time advance generator 810 which provides time advance signal 811 to two or more physically different PHY devices 862-863, each of which include a timing capability, timestamp counter and clock. Finally, FIG. 8D illustrates a device 870 including a PHY with a timing capability, with a timestamp counter, clock, and time advance generator configured to generate time advance signal 871, which is provided to one or more other PHY devices 873, each including a timing capability with a timestamp counter and clock.

Figure 9A:
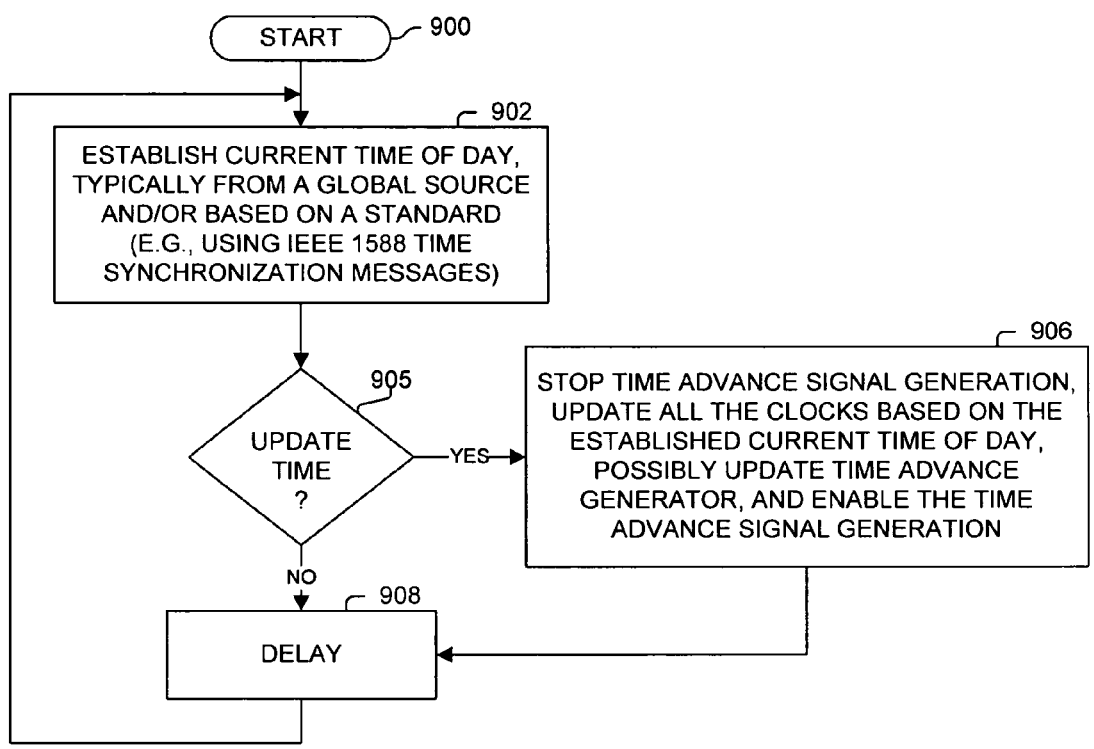
FIGS. 9A-C are flow diagrams illustrating processes performed in one embodiment.
Figure 9B:
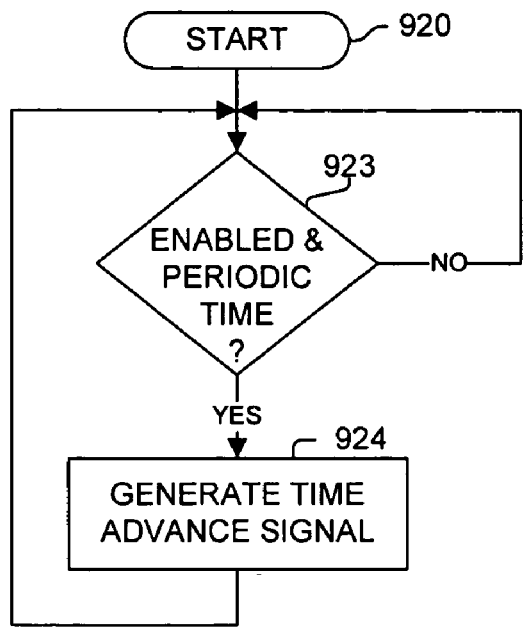
Figure 9C:
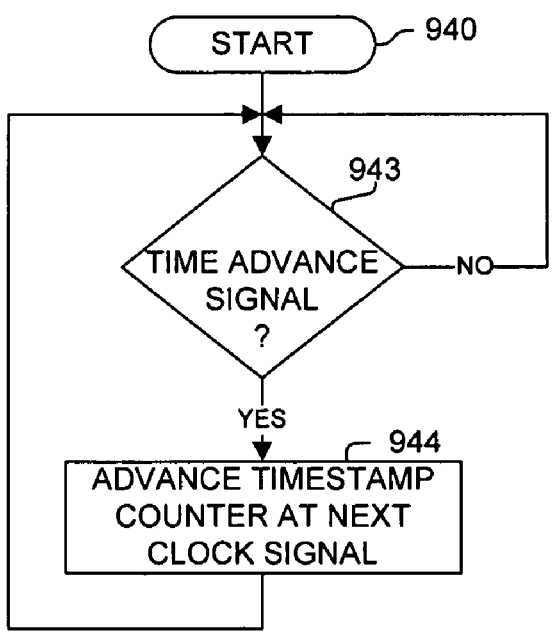

FIGS. 9A-C are flow diagrams illustrating processes performed in one embodiment.

FIG. 9A illustrates a process used in one embodiment to initialize the timestamp counters of multiple, physically different devices. Processing begins with process block 900. In process block 902, the current time of day is established typically from a global source and/or a standard time distribution mechanism (e.g., a version of IEEE 1588 with its time synchronization messages, ResE, AVB, etc.). As determined in process block 905 if the time should be updated, then in process block 906, the time the sequence of: (a) disabling the time advance generator, (b) setting said current timestamp value of each of the plurality of timestamp counters; and then (c) enabling the time advance generator is performed. In one embodiment, this completes the processing. FIG. 9A illustrates one embodiment will occasionally determine whether or not it should update the time again after a delay illustrated by process block 908.

FIG. 9B illustrates a process used in one embodiment for generating a time advance signal. Processing begins with process block 920. As determined in process block 923, if the time advance generator is enabled and it is the correct periodic time to generate the time advance signal, then the time advance signal is generated in process block 924, and processing returns to process block 923. Otherwise, processing delays until the proper time at process block 923.

FIG. 9C illustrates a process used in one embodiment for maintaining the current timestamp value in a timestamp counter. Processing begins with process block 940. As determined in process block 943, if the time advance signal indicates to advance the current value of the timestamp counter, then in process block 944, the current value of the timestamp counter is advance in response to the next clock signal, and processing returns to process block 943. Otherwise, processing delays at process block 923 until the time advance signal allows the advancement of the current value of the timestamp counter.

Figure 10:
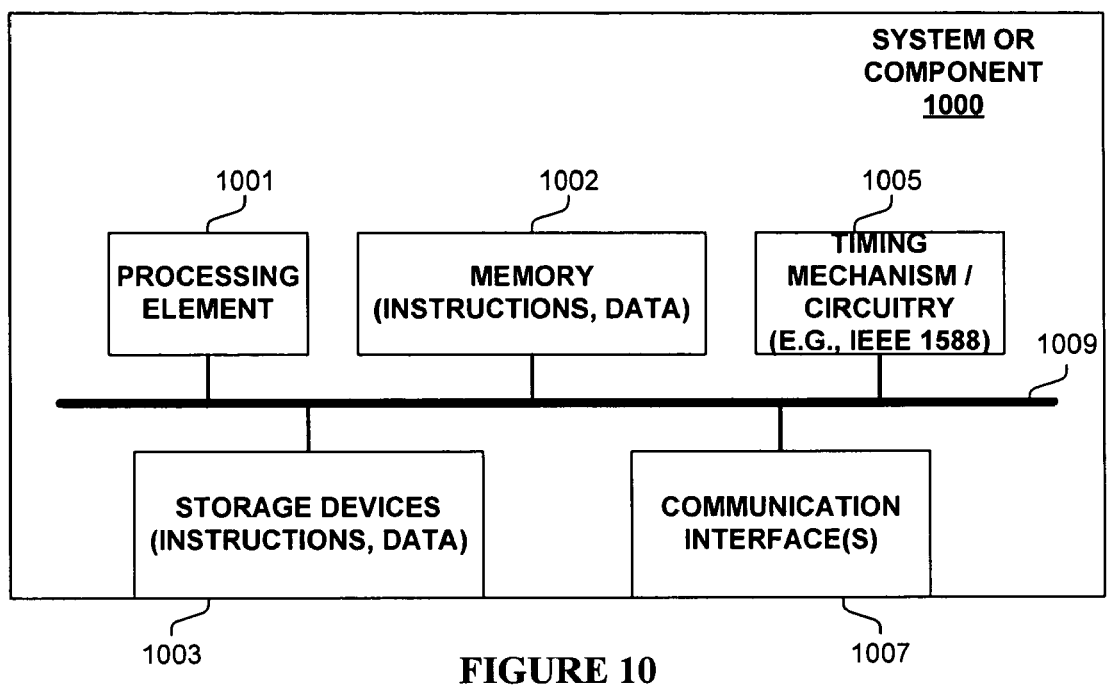
FIG. 10 is a block diagram of a system or component used in one embodiment.

FIG. 10 is block diagram of a system or component 1000 used in one embodiment of a communications device (e.g., PHY) or system. In one embodiment, system or component 1000 performs one or more processes corresponding to one of the flow diagrams illustrated or otherwise described herein. In one embodiment, system or component 1000 corresponds to PHY, or portion thereof.

In one embodiment, system or component 1000 includes a processing element 1001, memory 1002, storage devices 1003, specialized components 1005 (e.g. timing mechanism compliant with IEEE 1588 Standard for a Precision Clock Synchronization Protocol for Networked Measurement and Control Systems, time advance generator and/or timestamp counter, etc.), and interfaces 1007 for sending and receiving frames and/or communicating frames between a medium and a MAC. These elements are typically communicatively coupled via one or more communications mechanisms 1009, with the communications paths typically tailored to meet the needs of the application.

Various embodiments of component 1000 may include more or less elements. The operation of component 1000 is typically controlled by processing element 1001 using memory 1002 and storage devices 1003 to perform one or more tasks or processes. Memory 1002 is one type of computer-readable medium, and typically comprises random access memory (RAM), read only memory (ROM), flash memory, integrated circuits, and/or other memory components. Memory 1002 typically stores computer-executable instructions to be executed by processing element 1001 and/or data which is manipulated by processing element 1001 for implementing functionality in accordance with an embodiment. Storage devices 1003 are another type of computer-readable medium, and typically comprise solid state storage media, disk drives, diskettes, networked services, tape drives, and other storage devices. Storage devices 1003 typically store computer-executable instructions to be executed by processing element 1001 and/or data which is manipulated by processing element 1001 for implementing functionality in accordance with an embodiment.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A single appliance configured to maintain consistency among a plurality of timestamp counters distributed among a plurality of devices within the single appliance, the single appliance comprising:

the plurality of timestamp counters with each of the plurality of timestamp counters configured to maintain a current timestamp value of a global time, with each of the plurality of timestamp counters disposed in a physical device of the plurality of devices within the single appliance different from the physical device of the plurality of devices within the single appliance in which another of said timestamp counters are disposed; wherein each of said timestamp counters receives a clock signal generated from a same or different clock of one or more clocks; wherein each particular timestamp counter of the plurality of timestamp counters includes a time advance input for either enabling or disabling the advancement of said particular timestamp counter by a same predetermined constant amount at the frequency defined by the clock signal, with each said particular timestamp counter being configured to be responsive to a clock advance signal communicated to its said time advance input in order to determine whether or not to advance its current timestamp value by the same predetermined constant amount in response to its said received clock signal; and a time advance generator, within the single appliance, configured to periodically generate the clock advance signal, wherein the time advance generator is communicatively coupled to said time advance input of each of the plurality of timestamp counters such that said time advance input of each of the plurality of timestamp counters receive the same clock advance signal; wherein the clock advance signal is an enable/disable signal and does not include a specification of the predetermined amount.

2. The single appliance of claim 1, wherein each of said physical devices comprise different Physical Layer Transceivers (PHYs), and the timestamp counters are located in said PHYs.

3. The single appliance of clam 2, comprising a processor communicatively coupled to each of the timestamp counters; wherein the processor is configured to set said current timestamp value of each of the plurality of timestamp counters.

4. The single appliance of claim 3, wherein each of said PHYs are configured to store a timestamp acquired from its respective said timestamp counter corresponding to a received packet.

5. The single appliance of claim 4, wherein said timestamps are generated by the plurality of timestamp counters according to IEEE 1588 Standard for a Precision Clock Synchronization Protocol for Networked Measurement and Control Systems.

6. The single appliance of claim 5, wherein the processor is configured to collect said stored timestamps from said PHYs.

7. The single appliance of clam 2, comprising a processor communicatively coupled to each of the timestamp counters; wherein the processor is configured to perform the sequence of: (a) disabling the time advance generator, (b) setting said current timestamp value of each of the plurality of timestamp counters to a same nonzero value; and then (c) enabling the time advance generator.

8. The single appliance of claim 7, wherein said timestamps are generated by the plurality of timestamp counters according to IEEE 1588 Standard for a Precision Clock Synchronization Protocol for Networked Measurement and Control Systems.

9. The single appliance of claim 2, wherein the time advance generator is located in one of said PHYs.

10. The single appliance of claim 1, wherein the time advance generator is located in one of said physical devices with one of said timestamp counters.

11. The single appliance of clam 10, comprising a processor communicatively coupled to each of the timestamp counters and the time advance generator: wherein the processor is configured to perform the sequence of: (a) disabling the time advance generator, (b) setting said current timestamp value of each of the plurality of timestamp counters; and then (c) enabling the time advance generator.

12. The single appliance of claim 1, wherein the time advance generator includes an accumulator, with the time advance signal corresponding to an overflow signal of the accumulator.

13. The single appliance of claim 1, wherein the time advance generator includes an accumulator, with the time advance signal corresponding to a bit value of one of the bits of the accumulator.

14. A single appliance configured to maintain consistency among timestamp counters distributed among Physical Layer Transceivers (PHYs) within the single appliance, the single appliance comprising:

a plurality of physically different PHY devices within the single appliance, with each of said PHY devices including one or more PHY interfaces configured to interface between a medium and a Media Access Controller (MAC) and configured to record current timestamp values associated with certain interfaced packets, said PHY physical devices including a first PHY device and one or more second PHY devices;

wherein each of said PHY devices includes a timestamp counter configured to maintain its said current timestamp value of a global time in response to a clock signal and a clock advance signal, wherein the clock advance signal either enables or disables the advancement of the timestamp counter by a same predetermined constant amount at the frequency defined by said clock signal; and wherein the first PHY device includes a time advance generator configured to periodically generate the clock advance signal, wherein the clock advance signal is communicatively coupled to said timestamp counter in each of said PHY devices such that the clock advance signal is received by all of said timestamp counters in each of said PHY devices; wherein the clock advance signal is an enable/disable signal and does not include a specification of the predetermined amount.

15. The single appliance of claim 14, wherein each of said PHY devices includes a clock configured to generate its said clock signal.

16. The single appliance of claim 14, including a processing device, communicatively coupled to each of said PHY devices, configured to control the starting and stopping of the time advance generator.

17. The single appliance of claim 16, wherein the processing device is configured to set each of said timestamp counters in said PHY devices to a nonzero value.

18. The single appliance of claim 16, wherein the processing device is configured to receive said recorded current timestamp values.

19. The single appliance of claim 14, wherein said current timestamp values are generated by the plurality of timestamp counters according to IEEE 1588 Standard for a Precision Clock Synchronization Protocol for Networked Measurement and Control Systems.

20. The single appliance of clam 14, comprising a processor communicatively coupled to each of the timestamp counters; wherein the processor is configured to perform the sequence of: (a) disabling the time advance generator, (b) setting said current timestamp value of each of the plurality of timestamp counters to a same nonzero value; and then (c) enabling the time advance generator.

21. The single appliance of claim 14, wherein the time advance generator includes an accumulator, with the time advance signal corresponding to an overflow signal of the accumulator.

22. The single appliance of claim 14, wherein the time advance generator includes an accumulator, with the time advance signal corresponding to a bit value of one of the bits of the accumulator.

23. A method performed in a single appliance for maintaining consistency among timestamp counters for timestamping packets, the method comprising:
  setting a timestamp counter of a plurality of different timestamp counters to current time of day, with each of the plurality of different timestamp counters being disposed in a physically different device of a plurality of different devices within the single appliance;
  periodically generating a time advance signal in one of said plurality of different devices and providing the time advance signal to each of said timestamp counters, and advancing, by a corresponding predetermined constant amount, said current timestamp value of each particular timestamp counter of said timestamp counters in response to the time advance signal enabling of said advancement of each of said timestamp counters and an additional respective clock signal corresponding to said different device in which said particular timestamp counter is disposed; and
  recording timestamps corresponding to packets by each of the plurality of different devices and providing said recorded timestamps to one or more external devices;
  wherein the time advance signal simply identifies either enablement or disablement of the advancement of each of said timestamp counters and does not include a specification of an amount by which to advance said timestamp counters.

24. The method of claim 23, wherein said setting set timestamp counters to said current time of day includes: sending and receiving of IEEE 1588 Standard for a Precision Clock Synchronization Protocol for Networked Measurement and Control Systems (IEEE 1588) time synchronization messages with an external clocking device to establish said current time of day according to IEEE 1588.

25. The method of claim 23, comprising stopping said period generation of the time advance signal, which causes said timestamp counters to stop said advancing their current timestamp values.

26. The method of claim 23, wherein the time advance signal is generated based on an overflow signal of an accumulator within the single appliance.

27. The method of claim 23, wherein the time advance signal is generated based on a bit value of an accumulator within the single appliance.

28. A single appliance configured to maintain consistency among timestamp counters used for timestamping packets, the single appliance comprising:
  means for setting a timestamp counter of a plurality of different timestamp counters to current time of day, with each of the plurality of different timestamp counters being disposed in a physically different device of a plurality of different devices within the single appliance;
  means for periodically generating a time advance signal in one of said plurality of different devices and providing the time advance signal to each of said timestamp counters, wherein the time advance signal simply identifies either enablement or disablement of the advancement of each of said timestamp counters by a predetermined constant amount at the frequency defined by one or more clock signals and does not include a specification of an amount by which to advance said timestamp counters;
  a plurality of means for advancing said current timestamp value of each particular timestamp counter of said timestamp counters in response to the time advance signal and an additional respective clock signal corresponding to said different device in which said particular timestamp counter is disposed, each of said means for advancing said current timestamp value of each particular timestamp counter of said timestamp counters being communicatively coupled to said means for periodically generating the time advance signal; wherein each of the plurality of means for advancing said current timestamp value of each particular timestamp counter of said timestamp counters corresponds to a different one of the plurality of time stamp counters and is disposed in a corresponding one of said physically different devices within the single appliance; and
  means for recording timestamps corresponding to packets by each of the plurality of different devices and providing said recorded timestamps to one or more external devices.

29. The single appliance of claim 28, wherein said means for setting set timestamp counters to said current time of day includes: means for sending and receiving of IEEE 1588 Standard for a Precision Clock Synchronization Protocol for Networked Measurement and Control Systems (IEEE 1588) time synchronization messages with an external clocking device to establish said current time of day according to IEEE 1588.

30. The single appliance of claim 28, wherein said means for periodically generating the time advance signal includes an accumulator within the single appliance, with the time advance signal being an overflow signal of the accumulator.

31. The single appliance of claim 28, wherein said means for periodically generating the time advance signal includes an accumulator within the single appliance, with the time advance signal being a bit value of one of the bits of the accumulator.

* * * * *

UNITED STATES PATENT AND TRADEMARK OFFICE
CERTIFICATE OF CORRECTION

| | | |
|---|---|---|
| PATENT NO. | : 7,885,296 B2 | Page 1 of 1 |
| APPLICATION NO. | : 11/494104 | |
| DATED | : February 8, 2011 | |
| INVENTOR(S) | : Biederman et al. | |

It is certified that error appears in the above-identified patent and that said Letters Patent is hereby corrected as shown below:

Col. 12, Line 66, replace "requester." with -- requestor. --

Col. 15, Line 58, Claim 3, replace "clam 2," with -- claim 2, --

Col. 16, Line 6, Claim 7, replace "clam 2," with -- claim 2, --

Col. 16, Line 23, Claim 11, replace "clam 10," with -- claim 10, --

Col. 16, Line 26, Claim 11, replace "generator:" with -- generator; --

Col. 17, Line 19, Claim 20, replace "clam 14," with -- claim 14, --

Signed and Sealed this
First Day of January, 2013

David J. Kappos
*Director of the United States Patent and Trademark Office*